P. A. RITTER.
PISTON FOR INTERNAL COMBUSTION ENGINES.
APPLICATION FILED JULY 16, 1915. RENEWED OCT. 25, 1918.
1,305,567.
Patented June 3, 1919.
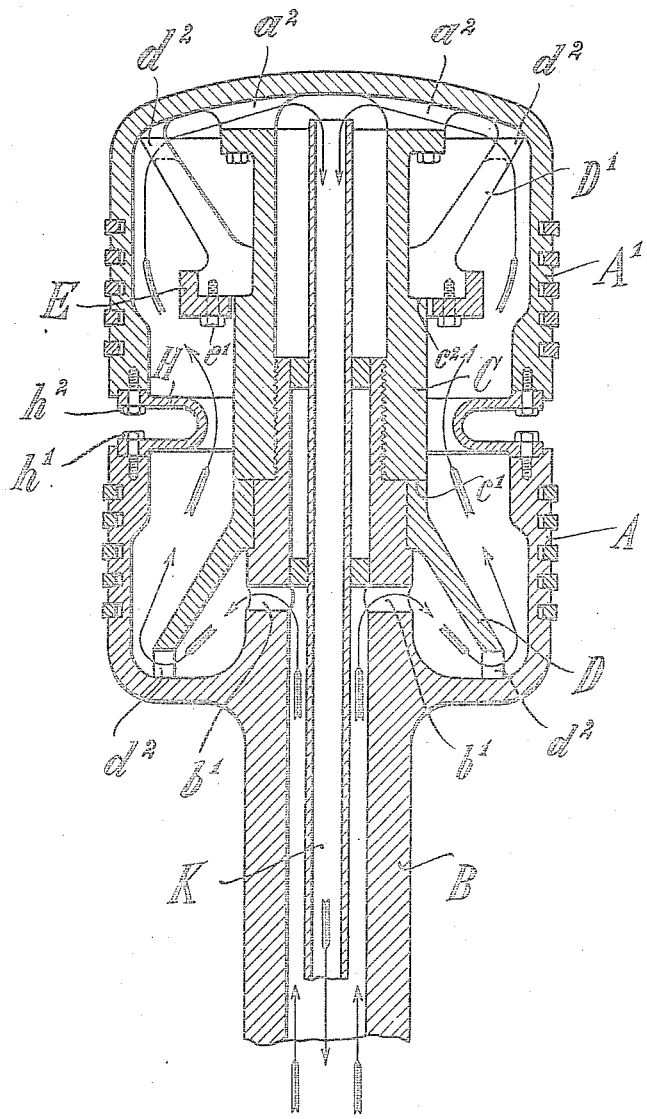

ID

UNITED STATES PATENT OFFICE.

PAUL A. RITTER, OF KIEL, GERMANY, ASSIGNOR TO FRIED. KRUPP AKTIENGESELL-
SCHAFT GERMANIAWERFT, OF KIEL-GAARDEN, GERMANY.

PISTON FOR INTERNAL-COMBUSTION ENGINES.

1,305,567.	Specification of Letters Patent.	Patented June 3, 1919.

Application filed July 16, 1915, Serial No. 40,283.  Renewed October 25, 1918.  Serial No. 259,719.

*To all whom it may concern:*

Be it known that I, PAUL A. RITTER, a citizen of the German Empire, residing at Kiel, Germany, have invented certain new and useful Improvements in Pistons for Internal-Combustion Engines, of which the following is a specification.

This invention relates to those pistons for internal combustion engines, the cylindrical part of which rests freely upon the end walls of the piston; its object is to enable the piston to expand freely on all sides.

The invention will be described with reference to the accompanying drawing which shows a vertical longitudinal section through the piston for a double acting engine.

The body of the piston is divided at right angles to its longitudinal axis into two parts A and $A^1$, each part of which is capable of expanding freely independently of the other, axially and radially. For this purpose both the cylindrical walls of the piston, as well as the ends thereof, are made as thin as possible and the ends are connected at the center only to the piston rod B and its extension C. The end of the lower half of the piston is made in one piece with the piston rod B, while that of the upper half of the piston is screwed to the extension sleeve C which latter is screwed on to the end of the piston rod. In order to impart to the comparatively weak piston ends sufficient strength to meet the working pressures acting upon them, special supporting devices D, $D^1$ of hollow conical form are provided, the adjacent ends of which are supported against the projecting lower end face $c^1$ of the extension sleeve C, and against a shoulder $c^2$ provided on the sleeve, while their outer terminal annular surfaces bear against the ends of the piston, as near as possible to the cylindrical portion. In order to enable the upper supporting device $D^1$ to be brought on to the sleeve C it is made in two parts. Both halves of it are held together by a ring E which is pushed over it and secured by means of screws $e^1$. The contacting surfaces between the ends of the piston and the supporting devices are planed so that the two parts can execute a sliding movement relatively to each other, whereby the expansion of the ends of the piston in a radial direction is insured. Since furthermore the division of the cylindrical part of the piston into two halves separated from each other, also enables relative movements of the two cylindrical piston halves to take place in an axial direction, the above described piston is consequently capable of expanding freely in all directions.

To enable the piston to be cooled and at the same time to maintain the free movability of the two cylindrical parts A and $A^1$ of the piston relatively to each other unimpaired, a U-shaped elastic diaphragm H is inserted between their end faces and secured watertight thereto by means of screws $h^1$, $h^2$. The supporting devices D, $D^1$ also serve at the same time to supply water, as they conduct the cooling water supplied through the hollow piston rod B and the openings $b^1$ along the inner walls of the piston in the manner indicated by arrows in the drawing. They are formed for this purpose with openings $d^2$ for the passage of the water. In like manner the inner flange of the upper piston end, which serves for the attachment of the sleeve C, is formed with suitable openings $a^2$ for the passage of the cooling water. The cooling water is carried away, in the well-known way, through a pipe K fixed watertight in the hollow piston rod.

The shape of the supporting devices may differ from the hollow conical form shown; the only important point is that they shall support the ends of the piston as close as possible to the cylindrical surface of the piston and permit of a sliding movement that is to say a radial expansion of the end of the piston. The form of the diaphragm H may naturally also differ from that shown.

Claims:

1. An expansible piston for engines having a cylindrical portion closed at both ends and made with thin walls, the central part of the closed ends forming rigid connection with the piston rod, a supporting device secured to the piston rod and abutting against the closed ends near the cylindrical portion permitting unimpeded radial expansion of said end walls.

2. A piston for double-acting engines having two separated cylindrical portions with transverse walls completely closing their remote ends, said transverse walls forming rigid connections at the center with the piston rod, said cylindrical portions being radially unrestrained by the piston rod, and said walls and cylindrical portions being made comparatively thin, whereby unimpeded radial and axial expansion of said portions independently of each other is possible.

3. A piston for double-acting engines having two separated cylindrical portions with transverse walls completely closing their remote ends, said transverse walls forming rigid connections at the center with the piston rod, a supporting device secured to the piston rod and abutting against said transverse walls adjacent to the cylindrical portion, said walls and cylindrical portions being made comparatively thin, whereby unimpeded radial and axial expansion of said portions independently of each other is possible.

4. A piston for double-acting engines having two separated cylindrical portions with transverse walls completely closing their remote ends, said transverse walls forming rigid connections at the center with the piston rod, a water-tight elastic diaphragm connecting the adjacent ends of said cylindrical portions; said walls and cylindrical portions being made comparatively thin; whereby unimpeded radial and axial expansion of said portions independently of each other is possible.

5. A piston for double-acting engines having two separated cylindrical portions with transverse walls completely closing their remote ends, said transverse walls forming rigid connections at the center with the piston rod, a hollow cone-shaped supporting member for each of said cylindrical portions, the base of said member abutting against the transverse wall adjacent to the cylindrical portion and its apex secured to the piston rod; said walls and cylindrical portions being made comparatively thin, whereby unimpeded radial and axial expansion of said portions independently of each other is possible.

6. A piston for double-acting engines having two separated cylindrical portions with transverse walls completely closing their remote ends, said transverse wall forming rigid connections at the center with the piston rod; a hollow cone-shaped supporting member for each of said cylindrical portions, the base of said member abutting against the transverse wall adjacent to the cylindrical portion and its apex secured to the piston rod, said supporting members being provided with passages for conducting cooling water along the hottest parts of the piston; said walls and cylindrical portions being made comparatively thin, whereby unimpeded radial and axial expansion of said portions independently of each other is possible.

7. A piston for double-acting engines having two separated cylindrical portions with transverse walls completely closing their remote ends, said transverse walls forming rigid connections at the center with the piston rod; a hollow cone-shaped supporting member for each of said cylindrical portions, the base of said member abutting against the transverse wall adjacent to the cylindrical portion and its apex secured to the piston rod, said supporting members being provided with passages for conducting cooling water along the hottest parts of the piston, a water-tight elastic diaphragm connecting the adjacent ends of said cylindrical portions; said walls and cylindrical portions being made comparatively thin, whereby unimpeded radial and axial expansion of said portions independently of each other is possible.

In testimony whereof the foregoing specification is signed in the presence of two witnesses.

PAUL A. RITTER.

Witnesses:
JULIUS RÖPKE,
HERMANN SCHÜTT